Mar. 20, 1923.
R. N. EHRHART.
EJECTOR APPARATUS FOR EXHAUSTING AIR OR OTHER FLUIDS.
FILED MAY 10, 1919.
1,449,220.
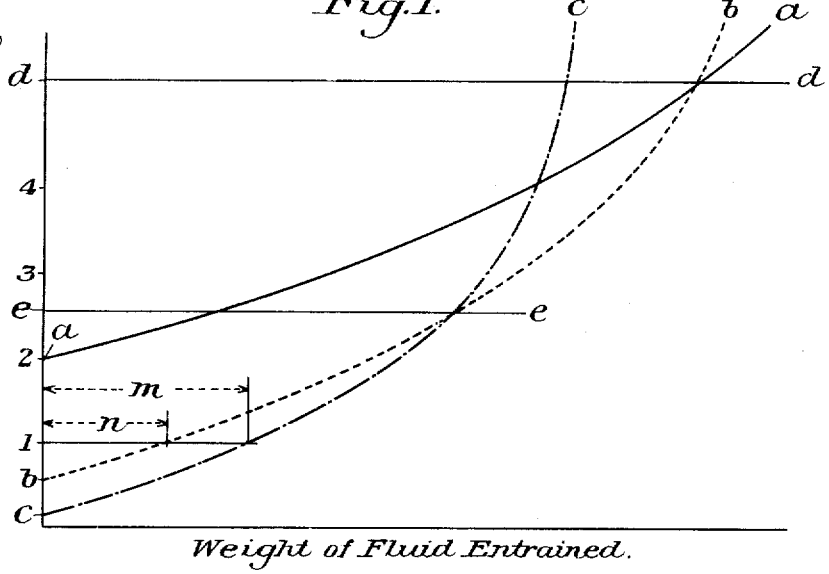
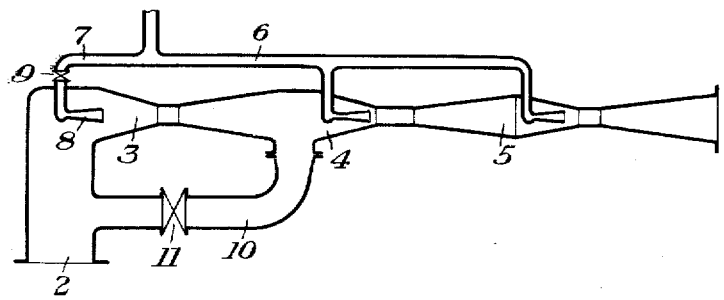

Patented Mar. 20, 1923.

1,449,220

UNITED STATES PATENT OFFICE.

RAYMOND N. EHRHART, OF PITTSBURGH, PENNSYLVANIA, ASSIGNOR TO ELLIOTT COMPANY, OF PITTSBURGH, PENNSYLVANIA, A CORPORATION OF PENNSYLVANIA.

EJECTOR APPARATUS FOR EXHAUSTING AIR OR OTHER FLUIDS.

Application filed May 10, 1919. Serial No. 296,237.

*To all whom it may concern:*

Be it known that I, RAYMOND N. EHRHART, a citizen of the United States, residing at Pittsburgh, Allegheny County, Pennsylvania, have invented a new and useful Improvement in Ejector Apparatus for Exhausting Air or Other Fluids, of which the following is a full, clear, and exact description, reference being had to the accompanying drawing, forming part of this specification, in which—

Figure 1 is a diagram illustrating the relative efficiency of my invention, and

Figure 2 is a diagrammatic sectional view of apparatus embodying the invention.

My invention has relation to apparatus for exhausting air, vapor and non-condensible gases from receivers and compressing them to a higher pressure. The invention is designed to provide a three-stage ejector of greater efficiency than those heretofore used and having means whereby it may be readily operated either as a two-stage or a three-stage ejector.

While three-stage ejectors have heretofore been proposed, they have not to my knowledge been put into commercial use to any extent for the reason that the laws governing their proportioning have not been clearly understood, and also because their useful working range is very limited. In applying such ejectors to condensers and the like, it is desirable to have an efficient apparatus that will maintain absolute pressures of from one to four inches of mercury at the suction or low pressure side, and atmospheric pressure or slightly above it on the discharge side. Single-stage ejectors of the type commonly used have not been successful for this work, inasmuch as they cannot maintain pressures materially less than 2" of mercury. Double-stage ejectors have been used to a large extent, and are quite satisfactory for maintaining pressures as low as 2" of mercury, but their efficiency is not good for maintaining pressures lower than this. They can maintain lower pressures, but the amount of air exhausted is very small in comparison with the amount of steam consumed, so that their efficiency has not been considered as good as that of some other types of pumps.

I have discovered that a three-stage ejector can be provided for maintaining pressures approximately less than 2" of mercury which are more efficient than the two-stage ejectors; although for pressures materially above 2" of mercury, the three-stage ejector is very unsatisfactory on account of the small amount of air removed for a given steam consumption.

In Figure 1 I have shown a diagram illustrating the characteristics of one, two or three-stage ejectors, respectively, when producing certain degrees of rarefications and working against the same discharge pressures, each supplied with the same amount of propelling fluid at the same pressure. In this diagram the ordinates represent absolute pressures in inches of mercury while the abscissae represent weights of fluid entrained. The curve $a, a$, illustrates the performance of a single-stage ejector, the curve $b, b$ shows the operation of a two-stage ejector; and the line $c, c$ illustrates the operation of a three-stage ejector. It will be apparent from this diagram that at pressures higher than the point $d$ a single-stage ejector is the most efficient. For pressures higher than the point $e$ and less than $d$, the two-stage ejector is the most efficient; while for pressures below the point $e$, the three-stage ejector is the most efficient.

For example, at a pressure of $l''$ absolute, the single-stage ejector is useless; the two-stage will exhaust a quantity proportionate to the length of the line $n$; and the three-stage will exhaust an amount proportionate to the length of the line $m$.

In Figure 2 I have shown diagrammatically one form of apparatus embodying my invention. In this figure the numeral 2 designates the passage leading to the outlet of the condenser or other vessel to be exhausted. 3, 4 and 5 designate three ejectors of a three-stage ejector arranged in tandem, each consisting of a nozzle or nozzles and the usual converging-diverging diffusion structure. The nozzle, or nozzles, of each stage is connected to a source of steam supply such as the pipe 6. The connection 7 leading to the nozzle 8 of the first stage has a shut-off valve 9. 10 designates a by-pass from the passage 2 into the connection between the diffusion structures of the second and third-stage ejectors.

This by-pass is provided with a shut-off valve 11. By means of the valve 9 and the valved by-pass 10 I am enabled to shut off the supply of motive fluid from the first stage and to operate the last two stages alone. That is to say, if the pressure to be maintained is above the point e, the supply of motive fluid to the first stage will be shut off and the valve 11 opened. In this manner the benefit of the greater efficiency of the two-stage arrangement may be obtained at pressures above the point e.

The by-pass conduit 10 is of importance inasmuch as the passage through the first-stage is too constricted to allow the free flow of the fluid to the inlet of the last two stages.

The proportioning of the organized mechanism is important. If the steam consumption of the stage preceding the last two is greater than 12% of the total steam consumption, the efficiency of the organized mechanism is not satisfactory. I therefore limit the steam consumption of the first stage to 12% of that of the entire ejecting apparatus. I find further that in maintaining pressures of from one to three inches of mercury absolute, (which are those of the greatest commercial importance) the pressure at the beginning of the last two stages should vary within the range of from two to eight inches of mercury absolute. If the last two stages are proportioned not to have pressures within this range, the steam consumption is too great for the amount of air exhausted to make it efficiently applicable to such service as exhausting the air from condensers, evaporators, and the like. It is further desirable to proportion the last two stages of the apparatus so that when operating alone they will maintain pressures not exceeding three inches of mercury absolute. This is necessary on account of the fact that when serving condensers on which is imposed a steam load which varies over wide limits with great rapidity, it would not be practically possible to manually close off the motive fluid to the first stage and open up the by-pass conduit to adapt the apparatus to variations. That is to say, a wide and sudden variation in load on the main condenser might change the pressure in which the ejector exhausts over such limits that at one instant the outfit will require two stages operating for best efficiency, and at another instant three stages. The apparatus must, therefore, be proportioned to give reasonable efficiency with two stages alone operating, since the propelling fluid may be shut off from the first stage and the by-pass conduit opened at the time when the load decreased on the condenser. Under such conditions the two stages should be capable of maintaining a reasonable exhaustion. I find also that it is desirable to have the ratio of compression in the last two stages greater than in the preceding stages. I call the ratio of compression the ratio $$\frac{\text{Pressure at outlet}}{\text{Pressure at inlet}}$$

that is, if there is one inch absolute mercury pressure at the inlet of a stage, and four inches mercury absolute pressure at the outlet or discharge of that stage, the ratio of compression is four. Furthermore, the collective ratio of compression, or the product of the separate ratios of the last two stages should be greater than the ratio of compression in the preceding stage.

It will be understood that my invention is not limited to the particular embodiment which I have illustrated diagrammatically in Figure 2 since the three stages instead of being arranged in a straight line may be at different angles; the particular character of ejectors themselves may be varied; in some cases, more than three ejectors may be arranged in series, and various other changes may be made.

I claim:

1. Ejecting apparatus using an elastic propelling fluid and comprising more than two ejectors arranged in series and means for shutting off a supply of propelling fluid from the first ejector and initially directing the fluid to be ejected to an ejector beyond the first ejector, substantially as described.

2. Ejecting apparatus using an elastic propelling fluid and comprising more than two stages connected in series, and means independent of the passage through the first stage for admitting the fluid to be ejected to the subsequent stages and means for admitting steam to each stage of the apparatus, substantially as described.

3. Ejecting apparatus using an elastic propelling fluid and comprising three ejectors arranged in series means for admitting steam to each of said ejectors, means for shutting off the supply of steam from the first ejector, while continuing its admission to the other two ejectors, and a by-pass connection around the first ejector for the fluid to be ejected, substantially as described.

4. Ejecting apparatus using an elastic propelling fluid and comprising more than two ejectors connected in series, the last two ejectors being constructed and proportioned to maintain when operating alone a pressure not exceeding three inches of mercury absolute, substantially as described.

5. Ejecting apparatus using an elastic propelling fluid and consisting of three or more stages constructed and proportioned to maintain pressures not exceeding eight inches of mercury absolute at the inlet of the next to the last stage when the pressure at the beginning of the first stage is not in excess of three inches of mercury absolute, substantially as described.

6. Ejecting apparatus using an elastic propelling fluid and consisting of three stages the ejectors of the last two stages having a collective ratio of compression greater than the ratio of compression in the preceding stage, substantially as described.

7. Ejecting apparatus using an elastic propelling fluid comprising three or more stages constructed and proportioned to maintain pressures within a range of from two to eight inches of mercury absolute at the inlet of the last two stages when the pressure at the beginning of the first stage is not in excess of three inches of mercury absolute, substantially as described.

8. Ejecting apparatus using an elastic propelling fluid and consisting of more than two stages, the apparatus in the initial stage being proportioned to consume not more than 12% of the total steam consumption of the entire apparatus, and the ejector of the last two stages being constructed and proportioned to consume not less than 88% of the total steam consumption of the apparatus, substantially as described.

In testimony whereof, I have hereunto set my hand.

RAYMOND N. EHRHART.

Certificate of Correction.

It is hereby certified that in Letters Patent No. 1,449,220, granted March 20, 1923, upon the application of Raymond N. Ehrhart, of Pittsburgh, Pennsylvania, for an improvement in "Ejector Apparatus for Exhausting Air or other Fluids," an error appears in the printed specification requiring correction as follows: Page 1, line 84, for the letter "?" read /"; and that the said Letters Patent should be read with this correction therein that the same may conform to the record of the case in the Patent Office.

Signed and sealed this 5th day of June, A. D., 1923.

[SEAL.]

KARL FENNING,
*Acting Commissioner of Patents.*